US011402236B2

(12) United States Patent
Vaysse et al.

(10) Patent No.: US 11,402,236 B2
(45) Date of Patent: Aug. 2, 2022

(54) DEVICE FOR DETECTING AN INTENTION TO LOCK OR UNLOCK A DOOR OF A MOTOR VEHICLE, COMPRISING AN ELECTRODE OR TARGET SUPPORTED BY A FOAM BLOCK

(71) Applicant: VITESCO TECHNOLOGIES GMBH, Hanover (DE)

(72) Inventors: Bertrand Vaysse, Toulouse (FR); Gabriel Spick, Toulouse (FR)

(73) Assignee: VITESCO TECHNOLOGIES GMBH, Hanover (DE)

( * ) Notice: Subject to any disclaimer, the term of this patent is extended or adjusted under 35 U.S.C. 154(b) by 59 days.

(21) Appl. No.: 16/972,428

(22) PCT Filed: Jun. 7, 2019

(86) PCT No.: PCT/EP2019/065010
§ 371 (c)(1),
(2) Date: Dec. 4, 2020

(87) PCT Pub. No.: WO2019/234238
PCT Pub. Date: Dec. 12, 2019

(65) Prior Publication Data
US 2021/0231464 A1 Jul. 29, 2021

(30) Foreign Application Priority Data

Jun. 7, 2018 (FR) .................................. 1854952

(51) Int. Cl.
*G01D 5/20* (2006.01)
*E05B 81/76* (2014.01)
*G01D 5/24* (2006.01)
(52) U.S. Cl.
CPC ............... *G01D 5/20* (2013.01); *E05B 81/77* (2013.01); *G01D 5/24* (2013.01)

(58) Field of Classification Search
CPC ............ E05B 81/77; E05B 77/34; G01D 5/24
See application file for complete search history.

(56) References Cited

U.S. PATENT DOCUMENTS

| 8,482,303 B2 | 7/2013 | Van Gastel et al. |
| 9,447,604 B2 | 9/2016 | Witte et al. |
| (Continued) | | |

FOREIGN PATENT DOCUMENTS

| CN | 101873126 A | 10/2010 |
| CN | 103104143 A | 5/2013 |
| (Continued) | | |

OTHER PUBLICATIONS

International Search Report for PCT/EP2019/065010 dated Jun. 7, 2019, 6 pages.

(Continued)

*Primary Examiner* — Alvaro E Fortich
(74) *Attorney, Agent, or Firm* — Nixon & Vanderhye (57) ABSTRACT

Disclosed is a device for detecting a user's intention to lock or unlock a motor vehicle opening element, the device being intended to be integrated into a handle or into a frame of the opening element and including a voltage source, a printed circuit and at least one sensor for detecting an approach and/or contact of a hand of the user on the handle or the frame. A detection unit of the detection sensor is at least partially in the form of a metallized layer borne by part of an outer contour of a foam block in contact against the housing through a bearing face, the face of the foam block opposite the bearing face bearing the majority of the metallized layer.

20 Claims, 1 Drawing Sheet

(56) References Cited

U.S. PATENT DOCUMENTS

| | | | |
|---|---|---|---|
| 9,593,514 B2* | 3/2017 | Patel | E05B 85/10 |
| 10,428,562 B2 | 10/2019 | Guibbert et al. | |
| 2003/0218356 A1* | 11/2003 | Emerling | B60J 5/0418 |
| | | | 296/146.1 |
| 2017/0016255 A1 | 1/2017 | Guibbert et al. | |
| 2017/0260778 A1* | 9/2017 | Witte | G07C 9/00174 |
| 2019/0040659 A1* | 2/2019 | Sabah | G07C 9/00658 |

FOREIGN PATENT DOCUMENTS

| | | |
|---|---|---|
| CN | 104136697 A | 11/2014 |
| CN | 106338772 A | 1/2017 |
| DE | 10 2015 100 074 | 3/2016 |
| EP | 1 349 280 | 10/2003 |
| FR | 3038642 | 1/2017 |

OTHER PUBLICATIONS

Written Opinion of the ISA for PCT/EP2019/065010 dated Jun. 7, 2019, 6 pages.
Office Action issued in Chinese Patent Application No. 201980037427.X dated Jun. 3, 2021.

* cited by examiner

DEVICE FOR DETECTING AN INTENTION TO LOCK OR UNLOCK A DOOR OF A MOTOR VEHICLE, COMPRISING AN ELECTRODE OR TARGET SUPPORTED BY A FOAM BLOCK

CROSS-REFERENCE TO RELATED APPLICATIONS

This application is the U.S. national phase of International Application No. PCT/EP2019/065010 filed Jun. 7, 2019 which designated the U.S. and claims priority to FR 1854952 filed Jun. 7, 2018, the entire contents of each of which are hereby incorporated by reference.

BACKGROUND OF THE INVENTION

Field of the Invention

The present invention relates to a device for detecting a user's intention to lock or unlock a motor vehicle opening element, comprising a capacitive sensor and/or an inductive sensor with an electrode or a target supported by a foam block.

Description of the Related Art

The device for detecting intention to lock or unlock is intended to be integrated into a handle or into a frame of the opening element. The device comprises a voltage source, a printed circuit and at least one sensor for detecting an approach and/or contact of a hand of the user on the handle or the frame.

Such a sensor comprises a measuring circuit and at least one detection means that exhibits or induces a variation in a parameter representative of the approach and/or of the contact.

Conventionally, the measuring circuit, the voltage source and the printed circuit are housed in a housing, whereas said at least one detection means is housed outside the housing.

Nowadays, vehicle door handles are fitted with devices for detecting the presence of a user. The detection of the presence of a user, coupled with the recognition of a "hands-free" electronic fob for remote access control carried by this user, allows the remote locking and unlocking of the opening elements of the vehicle. Thus, when the user, carrying the corresponding electronic fob identified by the vehicle, wishes to unlock the vehicle, he approaches the handle or touches the door handle of the vehicle, and the opening elements of the vehicle are then automatically unlocked. By approaching or by pressing on a precise location of the door handle of the vehicle, called "unlocking zone", the door (or alternatively all of the opening elements) is (are) unlocked without any other action from the user.

Conversely, when the user, still carrying the necessary fob identified by the vehicle, wishes to lock his vehicle, he closes the door of his vehicle and he approaches or momentarily presses on another precise location of the handle, called "locking zone". This movement makes it possible to lock the opening elements of the vehicle automatically.

There are primarily two families of sensors for detecting an approach and/or contact of a hand of the user on the handle or the frame. The first family comprises capacitive sensors able to measure an approach and contact, and the second family comprises inductive sensors able only to measure contact of the hand of the user on the handle or the frame.

With sensors of the first family, presence detection devices generally comprise two capacitive sensors, in the form of two electrodes electrically connected to a printed circuit, integrated into the door handle, each in a precise locking or unlocking zone. Generally, one electrode is dedicated to each zone, that is to say one electrode is dedicated to detecting the approach and/or the contact of the hand of the user in the locking zone and one electrode is dedicated to detecting the approach and/or the contact of the hand of the user in the unlocking zone.

The presence detection device furthermore comprises a generally LF (abbreviation for "low-frequency") radiofrequency antenna. The detection device is connected to the electronic computer of the vehicle (ECU: abbreviation for "electronic control unit") and sends it a presence detection signal. The electronic computer of the vehicle has, beforehand, identified the user as being authorized to access this vehicle, or alternatively, following the reception of this presence detection signal, it performs this identification. To this end, it sends an identification request to the fob (or to the remote controller) carried by the user by way of the radiofrequency antenna. This fob in response sends its identification code to the electronic computer of the vehicle through RF (radiofrequency) waves. If the electronic computer recognizes the identification code as the one authorizing access to the vehicle, it triggers the locking/unlocking of the door (or of all of the opening elements). If, however, the electronic computer has not received any identification code or if the received identification code is erroneous, locking or unlocking is not performed.

Motor vehicles are therefore equipped with opening element handles or opening element frames comprising a detection device, itself comprising a generally low-frequency radiofrequency antenna, and two electrodes connected to a microcontroller, integrated into a printed circuit and supplied with a voltage.

However, this detection device of the prior art has major drawbacks.

Specifically, the detection of the approach of a user by at least one capacitive sensor is not robust and generates false detections.

In particular, in some environmental conditions, when the ambient air is humid or when there is salt on the roads, capacitive coupling is created between the detection zone or zones, on the one hand, and the metal parts of the vehicle, on the other hand, thereby preventing any detection of the presence of a user using the capacitive sensors.

In addition, raindrops or snowflakes on the door handle increase the capacitance value measured by the capacitive sensors, thus triggering false detections.

Lastly, detection by capacitive sensors is incompatible with handles coated with metallic paints or comprising chromed surfaces, the presence of metal in the handle creating coupling with the detection zones and inhibiting the detection of the presence of a user.

While, for some vehicles, false detections are not desirable, for other vehicles, false detections are not tolerable.

This is the case for vehicles fitted with deployable handles, that is to say the case of handles for which the detection of the presence of the user controls the movement of a motorized handle which, when at rest, is completely incorporated within the door and, when activated, is deployed and projects out of the door. For this type of handle, the unwanted deployment or retraction of the handle due to a false detection by the capacitive sensors risks pinching the hand of the user.

This is also the case for vehicles provided with electrically assisted opening, for which the detection of unlocking is accompanied not only by the door being unlocked but also by it opening. In this case, false detections result in unwanted openings of the door.

Lastly, false detections are not tolerable for vehicles provided with the "safe lock" security function, for which the detection of locking controls not only the locking of the vehicle from the outside but also the locking of the vehicle from the inside (anti-theft device). In this case, false detections may lead to the user being shut inside the vehicle.

In the following text, document FR-A-3 044 037, which discloses a capacitive sensor and an inductive sensor, will be taken as the closest prior art, but the teaching of this document may be taken with consideration to a capacitive sensor or an inductive sensor taken in isolation.

In the case of a capacitive sensor, the electrode or each electrode has to be electrically connected to the capacitive measuring circuit. With reference to document FR-A-3 044 037 for just the description of a capacitive sensor, this document describes a conductive flexible connection having a pivot point that electrically connects the electrode to the printed circuit. This flexible connection is not protected and may be damaged by an impact on the electrode.

It is also known to replace at least one of the capacitive sensors with an inductive sensor comprising a metal target that moves toward a coil of the sensor when the user presses on the locking or unlocking zone. The variation in inductance of the coil of the inductive sensor, due to the approach of the target, allows the detection of the user's intention to lock or unlock to be validated. However, this type of sensor also has a drawback, because it is sensitive to the vibrations of the vehicle, and to the shocks generated when doors are slammed. It is therefore also liable to generate false detections.

Although, for an inductive sensor, the target does not need to be electrically connected to the inductive measuring circuit, this target however needs to be supported near a detection zone on which the hand of the user presses, and also needs to be movable in order to be moved during such pressing. Its support is therefore problematic and crucial.

Document FR-A-3 044 037 also discloses a device for detecting a user's intention to lock or unlock a motor vehicle door, comprising an inductive sensor. The sensor comprises a coil and a non-magnetic metal target, the first face of which is oriented toward the handle and a second face of which is located opposite the coil. The target is able to move from a rest position, located close to the handle, to a final position, located close to the coil, under the effect of contact from the user on the handle.

The device comprises a capacitor connected to ground, the movable electrode, the coil and the capacitor being connected together in order to form a resonant circuit a resonant frequency of which varies as a function of a variation in the capacitance of the movable electrode, and as a function of the position of the movable electrode, said resonant frequency decreasing when the user approaches the handle and increasing when the user grips the handle and the electrode moves to the final position.

Means for oscillating the frequency of said resonant circuit and for measuring a resonant frequency of said resonant circuit are also present, as are means for comparing the resonant frequency with a first threshold and with a second threshold, means for controlling the frequency oscillation means, measuring means and frequency comparison means.

The device comprises means for storing times in memory, said means being able to store the first time of passage of the resonant frequency below a first threshold and a second time of passage of the resonant frequency above a second threshold. It is also equipped with means for calculating a duration between the first time and the second time and with means for comparing said duration with a predetermined duration.

The only support means for the target described in this document is a conductive flexible connection having a pivot point that electrically connects the electrode to the printed circuit. This conductive flexible connection may not be entirely satisfactory since it limits the movement of the target and thus reduces the reliability of inductive detection.

Therefore, the problem on which the present invention is based is that of designing a device for detecting a user's intention to lock and/or unlock a motor vehicle opening element, comprising a sensor for detecting the approach or pressing of the user on a handle or a frame of the opening element whose detection means, which is movable or non-movable, is effectively and durably supported so as to increase the detection reliability of the device, in particular when a pressing detection zone is situated on a portion of the handle or of the frame that poses a problem for the reliability of the detection.

SUMMARY OF THE INVENTION

To this end, the present invention relates to a device for detecting a user's intention to lock or unlock a motor vehicle opening element, the device being intended to be integrated into a handle or into a frame of the opening element and comprising a voltage source, a printed circuit and at least one sensor for detecting an approach and/or contact of a hand of the user on the handle or the frame, comprising a measuring circuit and at least one detection means that exhibits or induces a variation in a parameter representative of the approach and/or of the contact, the measuring circuit, the voltage source and the printed circuit being housed in a housing, whereas said at least one detection means is housed outside the housing, noteworthy in that the detection means is at least partially in the form of a metallized layer borne by part of an outer contour of a foam block in contact against the housing through a bearing face, the face of the foam block opposite the bearing face bearing the majority of the metallized layer.

The technical effect is that of using a foam block that is often present inside a handle or a frame as a support member for an electrode or a target depending on whether the sensor is a capacitive sensor or an inductive sensor, and of giving it either the role of an electrode of a capacitive sensor, in which case the electrode is electrically connected to the capacitive measuring circuit of the capacitive sensor, or the role of a target of an inductive sensor, in which case the target has to be movable when the hand of a user presses on an outer detection zone of the handle or of the frame, so that a movement of the target is tracked by the inductive measuring circuit of the inductive sensor and that detection of a press by the hand of a user is possible.

In the case of a capacitive sensor, the foam block serves to guarantee the sealtightness of an electrical connection member connecting the electrode to the capacitive measuring circuit. Specifically, it is often the case that only the foam block and the electrode that the block bears is outside a closed housing receiving at least the printed circuit and the capacitive measuring circuit inside it, a through-recess allowing an electrical connection to pass between the electrode and the capacitive measuring circuit. The foam block is of sufficient size to cover this recess and prevent water from infiltrating inside the housing, this not being able to be guaranteed by an electrical connection such as blade, tab or conductive flexible connection taken in isolation, as proposed by the closest prior art.

In the case of an inductive sensor, the major difficulty lies in the support for the target, which has to be durable while still being flexible enough not to hinder the movement of the target when the hand of the user presses on the detection zone. According to the invention, the foam block supporting the target is elastically deformable, whereas the closest prior art made provision for a conductive flexible connection having a pivot point. A foam block that is elastically deformable, advantageously in three dimensions, is better able to track the deformations of the handle or of the frame that are brought about by pressing of the hand of the user than a connection that is flexible but still has a rigid component, the flexibility being in only two directions in the case of a connection.

A foam block therefore represents an optimum support for a target by being able to deform in several directions and by returning to its starting position as soon as no pressing is performed on the detection zone.

Both for a capacitive sensor and for an inductive sensor, the electrode or the target has to be at least metallic and electrically conductive. It is sufficient to take a deformable foam block, advantageously already present in the handle or in the frame, and to subject it to a treatment of adding a metallized layer at least over a portion of its outer contour.

In summary, such a foam block provides a triple function by means of a relatively simple adaptation, that is to say the provision of a metallized layer over a portion of its outer contour, specifically wedging the detection device in the handle or the frame, protection against water infiltrating into the measuring circuit or circuits and the printed circuit, and a function of a non-magnetic metal target or conductive electrode with, in the latter case, a protected electrical connection of the electrode to the capacitive measuring circuit.

Advantageously, said at least one sensor is a capacitive sensor and said at least one detection means is an electrode electrically connected, directly or indirectly, to the capacitive measuring circuit, with the measuring circuit detecting a variation in a capacitance at the terminals of said at least one electrode representative of the approach and/or of the contact, the electrode being formed at least partially by the metallized layer.

The foam block forming the electrode support member is not mostly made of an electrically conductive material. It is an element integrated into the block, for example an extension of the metallized layer or an electrically conductive metal tab internal to the foam block that forms the electrical connection between the electrode and the capacitive measuring circuit of the capacitive sensor.

In a first preferred embodiment in the case of a capacitive sensor, the foam block is pierced with a passage extending from the printed circuit of the device to a portion of the metallized layer at least partially forming the electrode of the capacitive sensor, a deformable and conductive tab being housed in the passage, a first longitudinal end of the tab being connected, directly or indirectly, to the capacitive measuring circuit and a second longitudinal end opposite the first longitudinal end of the tab being connected to the portion of the metallized layer at least partially forming the electrode of the capacitive sensor.

In the case of a capacitive sensor, the electrode should be electrically connected to the capacitive measuring circuit. Using a tab that is protected over the majority of its length inside the foam block creates a protected electrical connection of the electrode to the capacitive measuring circuit.

In a second preferred embodiment in the case of a capacitive sensor, the metallized layer extends at least partially around an outer perimeter of the foam block while being interposed, by an intermediate part, between the foam block and the printed circuit, an electrical connection pad resting against the printed circuit, an extension of the electrode on the printed circuit or the capacitive measuring circuit and connected, directly or indirectly, to the capacitive measuring circuit being interposed between said intermediate part of the metallized layer and the printed circuit, the extension of the electrode on the printed circuit or the capacitive measuring circuit.

In this embodiment, it is the metallized layer that itself forms the connection member for connection to the printed circuit through its extension not serving as a target. There is no need to perforate the foam block to form an internal passage.

Advantageously, the electrode is divided into two parts, with a first part of the electrode forming an extension of the electrode that is electrically connected to the capacitive measuring circuit, and a second part formed by the portion of the metallized layer with, in the case of a tab, the first longitudinal end of the tab being connected to the first part of the electrode or, in the case of a pad, the pad being secured on one side to the first part of the electrode and secured on another side to the second part of the electrode.

Advantageously, said at least one sensor is an inductive sensor and said at least one detection means is a non-magnetic metal target able to move under the action of the hand of the user on the handle or the frame, the target being associated with a coil placed in an oscillating circuit comprising at least one capacitor and having a natural resonant frequency by being connected to an inductive measuring circuit comprising means for oscillating the oscillating circuit at a resonant frequency, means for measuring the resonant frequency and means for comparing between the measured resonant frequency and a predetermined resonant frequency threshold value, in order to detect the user's intention to lock or unlock the opening element through contact of the hand of the user on the handle or the frame, the target being formed by the metallized layer, the coil being mounted opposite the metallized layer with respect to the foam block, the foam block being able to deform under the action of the hand of the user on the handle or the frame.

For an inductive sensor, it is not necessary to have an electrical connection between the target and the inductive measuring circuit, the inductive measuring circuit being electrically connected to the coil that detects the movement of the target. On the other hand, mobility of the target when the detection zone is pressed is essential. This mobility is ensured by the deformable foam block. The size of the foam block is predetermined in order to adhesively bond the target against a portion of the internal wall of the handle or of the frame so that the pressure on the detection zone is reproduced on the target and induces a movement of the target.

It is possible for the detection device to combine a capacitive sensor with an inductive sensor. Advantageously, the detection device comprises a capacitive sensor and an inductive sensor, the metallized layer simultaneously forming the target of the inductive sensor and the electrode of the capacitive sensor.

It should be noted that the combination of a capacitive sensor and of an inductive sensor does not represent a juxtaposition of means, but provides synergy. For example, the capacitive sensor is able to detect the approach of a user, which cannot be achieved using an inductive sensor. It is then possible to vary the measurement frequency of the inductive sensor by accelerating this frequency as soon as the capacitive sensor has detected an approach, the inductive sensor being able to be in energy-saving operation when idle for as long as the capacitive sensor has not detected this approach. Upon a press by the hand of the user, the capacitive and inductive sensors perform fast frequency measurements to detect and confirm the detection of one sensor by the other, for example of the capacitive sensor by the inductive sensor.

Generally speaking, the detection device according to the invention allows reliable and robust detection of the intention to unlock or lock the vehicle that does not lead to false detections and has an inconspicuous esthetic appearance and ergonomics, allowing maximum convenience, safety and efficiency for the user.

This meets a highly pressing need given that systems that perform not only unlocking but also opening of the opening element are developing rapidly and that false intention detections absolutely need to be prescribed for such systems.

Advantageously, the housing is closed and in two parts, with, in the case of a capacitive sensor, a through-recess formed in the housing for an electrical connection between the electrode and the capacitive measuring circuit covered by the foam block.

In the case of an inductive sensor, it is highly advantageous for the target to bear against a portion of the internal wall of the handle or of the frame. Arranging the foam block outside the housing makes it possible to reduce the dimensions of the housing and to use a wedging foam block that is already present as foam block.

In the case of a capacitive sensor, the electrical connection between the electrode outside the housing and the capacitive measuring circuit in the housing is protected by the foam block because the foam block obstructs the recess formed in the housing and guarantees the internal sealtightness of the housing.

Advantageously, a polyurethane foam is inserted into the housing in order to protect and keep the rest of the device housed inside the housing. This polyurethane foam should not be confused with the foam block bearing a metallized layer, and does not play any role in the electrical connection between the electrode and the capacitive measuring circuit of the capacitive sensor, by only performing a role of wedging and insulating the elements situated inside the housing.

The invention also relates to a handle or frame of a motor vehicle opening element having an internal cavity, noteworthy in that the handle or the frame houses such a detection device, the metallized layer being in contact with a portion of an internal wall of the handle or of the frame that delimits the internal cavity, the portion of the outer wall of the handle or of the frame facing the portion of the internal wall forming a detection zone for detecting an approach and/or contact of a hand of the user on the handle or the frame.

Advantageously, the foam block and the metallized layer are configured so as to locally match the contour of the portion of the internal wall of the handle or of the frame, the foam block wedging the detection device in the internal cavity and protecting against water infiltrating into the detection zone.

It is possible for the detection zone to be arranged in a substantially hidden portion of the handle or of the frame so as not to be spotted too easily and to conceal it, for example, without this being limiting, in a zone of the outer wall of the handle facing the opening element and not in a zone of the outer wall of the handle facing the external surroundings of the motor vehicle.

There are sometimes difficulties in keeping the detection means, advantageously an inductive sensor target, in position over this detection zone or in establishing an electrical connection between the detection means, advantageously a capacitive sensor electrode, and the measuring circuit of the sensor.

Using a foam block according to the invention solves this difficulty, part of the external shape of the foam block being able to be worked so as to match, as closely as possible, the portion of the inner wall of the handle or of the frame corresponding to the detection zone on the outside of the handle or of the frame, for example by giving the foam block and the metallized layer a curved profile corresponding substantially to the profile of this portion of the internal wall.

BRIEF DESCRIPTION OF THE DRAWINGS

Other features, aims and advantages of the present invention will become apparent on reading the following detailed description and on examining the appended drawings given by way of non-limiting example, and in which.

DESCRIPTION OF THE PREFERRED EMBODIMENTS

Figure 1:
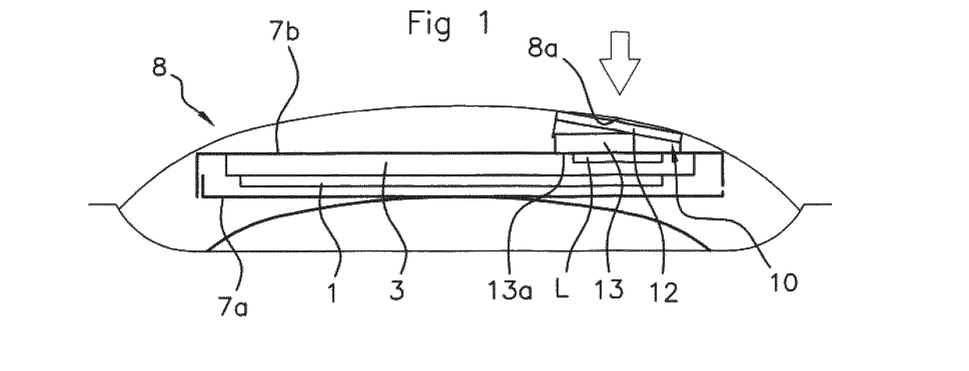
FIG. 1 is a schematic depiction of a longitudinal sectional view of a handle of an opening element equipped with a detection device comprising an inductive sensor according to a first embodiment of the present invention, a non-magnetic metal target being borne by a foam block and formed by a metallized layer.
Figure 2:
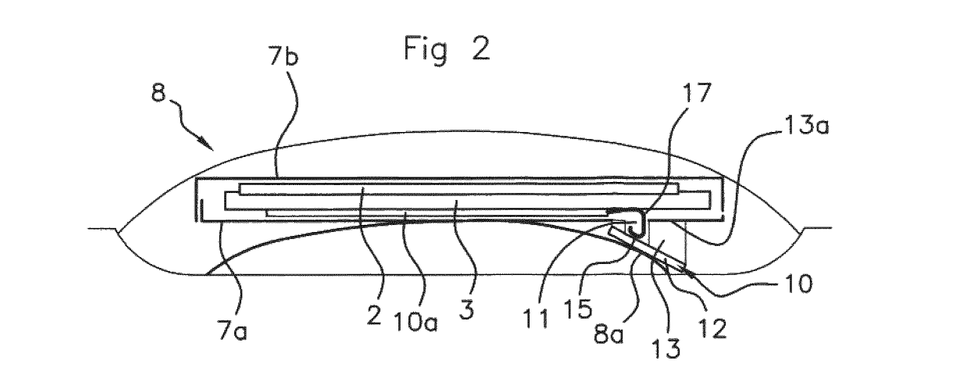
FIG. 2 is a schematic depiction of a longitudinal sectional view of a handle of an opening element equipped with a detection device comprising a capacitive sensor according to a second embodiment of the present invention, an electrode being borne by a foam block and formed by a metallized layer, a tab passing through the foam block so as to establish an electrical connection between the electrode and a capacitive measuring circuit.
Figure 3:
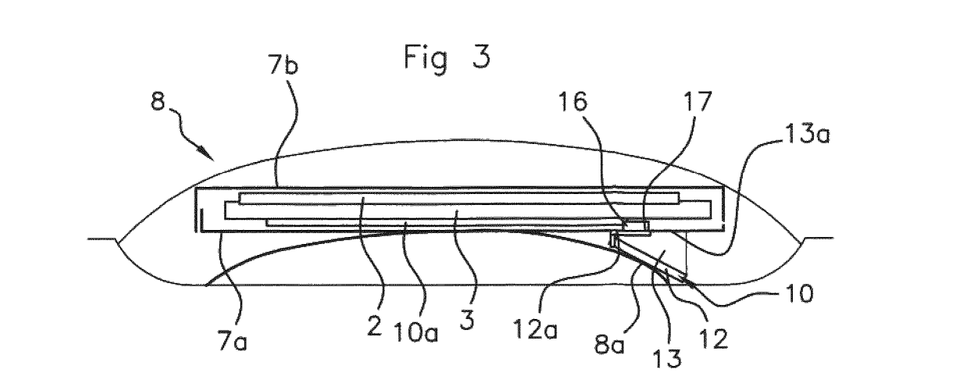
FIG. 3 is a schematic depiction of a longitudinal sectional view of a handle of an opening element equipped with a detection device comprising a capacitive sensor according to a third embodiment of the present invention, an electrode being borne by a foam block and formed by a metallized layer, the metallized layer having an intermediate extension part establishing an electrical connection between the electrode and the capacitive measuring circuit.

In the following text, in the figures, a non-magnetic metal target 10 of an inductive sensor or an electrode 10 of a capacitive sensor will be denoted by the same reference 10, being a detection means 10 of a sensor. FIGS. 1 to 3 show a motor vehicle opening element handle 8 housing the intention detection device, but the device may also be housed in an opening element frame. The arrow outside the handle 8 symbolizes an action of a hand of a user pressing on what is called a detection zone of the handle 8, that is to say a zone dedicated to detection by being associated internally with a detection means 10 forming part of a sensor for detecting intention to lock or unlock.

With reference to FIGS. 1 to 3, the present invention relates to a device for detecting a user's intention to lock or unlock a motor vehicle opening element, the device being intended to be integrated into a handle 8 or into a frame of the opening element and comprising a voltage source, a printed circuit 3 and at least one sensor for detecting an approach and/or contact of a hand of the user on the handle 8 or the frame.

The sensor for detecting intention to unlock may be a capacitive sensor, an inductive sensor or the combination of a capacitive sensor and a capacitive sensor, but this is not limiting. A sensor for detecting intention to lock may also be used, this possibly being a capacitive sensor, an inductive sensor or the combination of a capacitive sensor and a capacitive sensor. In the following text, reference is made to unlocking, but this is not limiting.

The detection sensor comprises a measuring circuit 1 or 2 and at least one detection means 10, advantageously a capacitive sensor electrode 10, an inductive sensor target 10 or an electrode 10 forming a target 10.

The detection means 10 exhibits or induces a variation in a parameter representative of the approach and/or of the contact, the measuring circuit 1, 2, the voltage source and the printed circuit 3 being housed in a housing 7a, 7b, whereas said at least one detection means 10 is housed outside the housing 7a, 7b.

According to the invention, the detection means 10 is at least partially in the form of a metallized layer 12 borne by part of an outer contour of a foam block 13 in contact against the housing 7a, 7b through a bearing face 13a, the face of the foam block 13 opposite the bearing face 13a bearing the majority of the metallized layer 12.

With reference more particularly to FIG. 1, in a first embodiment of the detection sensor, the or one of the detection sensors present in the detection device is an inductive sensor. In this case, the detection means is a non-magnetic metal target 10 able to move under the action of the hand of the user on the handle 8 or the frame. Such a target 10 is not connected to an inductive measuring circuit 1, its movement being tracked by a coil L. Such an inductive sensor is not suitable for detecting an approach of the user; only pressing on a detection zone 8a.

The target 10 is therefore associated with a coil L situated in an oscillating circuit comprising at least one capacitor and having a natural resonant frequency by being connected to an inductive measuring circuit 1.

The coil L of the inductive sensor may be integrated into the printed circuit 3. The printed circuit 3 may be in the form of a printed circuit board 3 bearing the coil L on one of its faces facing the target 10 of the inductive sensor.

The inductive measuring circuit 1 comprises means for oscillating the oscillating circuit at a resonant frequency, means for measuring the resonant frequency and means for comparing between the measured resonant frequency and a predetermined resonant frequency threshold value, in order to detect the user's intention to lock or unlock the opening element through contact of the hand of the user on the handle 8 or the frame.

The target 10 is formed by the metallized layer 12, the coil L being mounted opposite the metallized layer 12 with respect to the foam block 13. The foam block 13 is able to deform under the action of the hand of the user on the handle 8 or the frame.

The target 10 is in the form of a conductive and non-magnetic metallized layer 12 borne by the foam block 13 and bears on a portion of the internal wall of the handle 8 corresponding to the detection zone 8a located on a portion of the outer wall of the handle 8.

In second and third embodiments of the detection sensor, as shown in FIGS. 2 and 3, the detection sensor is a capacitive sensor. In this case, the detection means is an electrode 10 electrically connected, directly or indirectly, to the capacitive measuring circuit 2, with detection, by the measuring circuit 2, of a variation in a capacitance at the terminals of said at least one electrode 10 representative of the approach and/or of the contact.

The electrode 10 is formed at least partially by the metallized layer 12. An electrical connection should be established between the electrode 10 and the capacitive measuring circuit 2.

In one optional embodiment, the metallized layer may have a surface area less than the total surface area of one face of the foam block. In this way, by placing the metallized layer by lining it with foam, for example by inserting it into a cavity formed in a middle portion of the foam block, it is protected from any contact with water in the handle or the frame, the foam around the perimeter of the metallized layer forming one unit with the handle.

In FIG. 2, the foam block 13 is pierced with a passage 11 extending from the printed circuit 3 of the device to a portion of the metallized layer 12 at least partially forming the electrode 10 of the capacitive sensor.

A deformable and conductive tab 15 may be housed in the passage 11. A first longitudinal end of the tab 15 may be connected, directly or indirectly, to the capacitive measuring circuit 2 and a second longitudinal end opposite the first longitudinal end of the tab 15 may be connected to the portion of the metallized layer 12 at least partially forming the electrode 10 of the capacitive sensor.

For example, the first end of the tab 15 may be connected to the printed circuit 3 by being connected to the capacitive measuring circuit 2 located on the same face of the printed circuit 3 or on an opposite face. The first end of the tab 15 may also be connected directly to the capacitive measuring circuit 2.

In FIG. 3, the metallized layer 12 may extend at least partially around an outer perimeter of the foam block 13 while being interposed, by an intermediate part 12a, between the foam block 13 and the printed circuit 3. An electrical connection pad 16 may rest against and be connected, directly or indirectly, to the capacitive measuring circuit 2. Figure shows an extension 10a of the electrode bearing on the printed circuit 3, one end of which supports the electrical connection pad 16. As an alternative, the electrical connection pad 16 may rest on the printed circuit 3 while being electrically connected to the capacitive measuring circuit 2 or on the capacitive measuring circuit 2 itself.

The connection pad 16 may be interposed between said intermediate part 12a of the metallized layer 12 and the printed circuit 3, the extension 10a of the electrode on the printed circuit 3 or the capacitive measuring circuit 2. In FIG. 3, it is the printed circuit 3 that supports the pad 16, the connection pad 16 being connected to one end of the extension 10a of the electrode in order to be connected to the capacitive measuring circuit 2.

As shown in FIG. 3, the electrode 10 may be divided into two parts. A first part 10a of the electrode may be applied against and electrically connected to the capacitive measuring circuit 2, if necessary via the printed circuit 3, and a second part is formed by the portion of the metallized layer 12. This also applies for the second embodiment.

In FIG. 2, in the case of a tab 15, the first longitudinal end of the tab 15 may be connected to the first part 10a of the electrode applied against the printed circuit 3, this being shown in FIG. 2, or the capacitive measuring circuit 2. In FIG. 3, in the case of a pad 16, the pad 16 may be secured on one side to the first part 10a of the electrode and secured on another side to the second part of the electrode 10 formed by the metallized layer, in particular to the intermediate part 12a of the metallized layer 12.

In order to combine the advantages of the two sensors, the detection device may comprise a capacitive sensor and an inductive sensor, the metallized layer 12 simultaneously forming the target 10 of the inductive sensor and the electrode 10 of the capacitive sensor.

The inductive sensor may serve to confirm a user's intention to lock or unlock the opening element as detected by the capacitive sensor, advantageously in a phase of the user approaching that an inductive sensor is unable to detect.

When the capacitive sensor has detected an approach of the user that may lead to an intention to unlock, the inductive sensor then also performs a measurement function in order to detect an intention to unlock.

The foam block 13 and the metallized layer 12 may be arranged outside a housing 7a, 7b housing the rest of the device. The housing 7a, 7b may be closed and in two parts partially nested one inside the another with, in the case of a capacitive sensor, a through-recess 17 formed in the housing 7a, 7b for an electrical connection, for example either via the tab 15 or via an intermediate contact part 12a and pad 16, between the electrode 10 and the capacitive measuring circuit 2. The recess 17 may be covered by the foam block 13, thereby guaranteeing sealtightness inside the housing 7a, 7b.

A polyurethane foam may be inserted into the housing 7a, 7b in order to protect and keep the rest of the device housed inside the housing 7a, 7b.

The invention also relates to a handle 8 or frame of a motor vehicle opening element having an internal cavity, the handle 8 or the frame housing a detection device as described above.

The metallized layer 12 is in contact with a portion of an internal wall of the handle 8 or of the frame that delimits the internal cavity, the portion of the outer wall of the handle 8 or of the frame facing the portion of the internal wall forming a detection zone 8a for detecting an approach and/or contact of a hand of the user on the handle 8 or the frame. For a capacitive sensor, establishing such contact with the portion of an internal wall of the handle 8 or of the frame is not essential, but is advantageous since it makes it possible to keep the foam block 13 blocked firstly by the detection device and secondly by a portion of the internal wall of the handle 8 or of the frame. For an inductive sensor, establishing such contact is essential.

The foam block 13 and the metallized layer 12 may thus be configured so as to locally match the contour of the portion of the internal wall of the handle 8 or of the frame. The foam block 13 may wedge the detection device in the internal cavity and protect against water infiltrating into the detection zone 8a.

The invention claimed is:

1. A device for detecting a user's intention to lock or unlock a motor vehicle opening element, the device being intended to be integrated into a handle (8) or into a frame of the opening element and comprising a voltage source, a printed circuit (3) and at least one sensor for detecting an approach and/or contact of a hand of the user on the handle (8) or the frame, comprising a measuring circuit (1, 2) and at least one detection means (10) that exhibits or induces a variation in a parameter representative of the approach and/or of the contact, the measuring circuit (1, 2), the voltage source and the printed circuit (3) being housed in a housing (7a, 7b), whereas said at least one detection means (10) is housed outside the housing (7a, 7b), wherein the detection means (10) is at least partially in the form of a metallized layer (12) borne by part of an outer contour of a foam block (13) in contact against the housing (7a, 7b) through a bearing face (13a), the face of the foam block (13) opposite the bearing face (13a) bearing the majority of the metallized layer (12).

2. The detection device as claimed in claim 1, wherein said at least one sensor is a capacitive sensor and said at least one detection means is an electrode (10) electrically connected, directly or indirectly, to the capacitive measuring circuit (2), with the measuring circuit (2) detecting a variation in a capacitance at the terminals of said at least one electrode (10) representative of the approach and/or of the contact, the electrode (10) being formed at least partially by the metallized layer (12).

3. The detection device as claimed in claim 2, wherein the foam block (13) is pierced with a passage (11) extending from the printed circuit (3) of the device to a portion of the metallized layer (12) at least partially forming the electrode (10) of the capacitive sensor, a deformable and conductive tab (15) being housed in the passage (11), a first longitudinal end of the tab (15) being connected, directly or indirectly, to the capacitive measuring circuit (2) and a second longitudinal end opposite the first longitudinal end of the tab (15) being connected to the portion of the metallized layer (12) at least partially forming the electrode (10) of the capacitive sensor.

4. The detection device as claimed in claim 2, wherein the metallized layer (12) extends at least partially around an outer perimeter of the foam block (13) while being interposed, by an intermediate part (12a), between the foam block (13) and the printed circuit (3), an electrical connection pad (16) resting against the printed circuit (3), an extension (10a) of the electrode or the capacitive measuring circuit (2) and connected, directly or indirectly, to the capacitive measuring circuit (2) being interposed between said intermediate part (12a) of the metallized layer (12) and the printed circuit (3), the extension (10a) of the electrode or the capacitive measuring circuit (2).

5. The detection device as claimed in claim 3, wherein the electrode (10) is divided into two parts, with a first part (10a) of the electrode forming an extension of the electrode that is electrically connected to the capacitive measuring circuit (2), and a second part formed by the portion of the metallized layer (12) with, in the case of a tab (15), the first longitudinal end of the tab (15) being connected to the first part (10a) of the electrode or, in the case of a pad (16), the pad (16) being secured on one side to the first part (10a) of the electrode and secured on another side to the second part of the electrode (10).

6. The detection device as claimed in claim 1, wherein said at least one sensor is an inductive sensor and said at least one detection means is a non-magnetic metal target (10) able to move under the action of the hand of the user on the handle (8) or the frame, the target (10) being associated with a coil (L) placed in an oscillating circuit comprising at least one capacitor and having a natural resonant frequency by being connected to an inductive measuring circuit (1) comprising means for oscillating the oscillating circuit at a resonant frequency, means for measuring the resonant frequency and means for comparing between the measured resonant frequency and a predetermined resonant frequency threshold value, in order to detect the user's intention to lock or unlock the opening element through contact of the hand of the user on the handle (8) or the frame, the target (10) being formed by the metallized layer (12), the coil (L) being mounted opposite the metallized layer (12) with respect to the foam block (13), the foam block (13) being able to deform under the action of the hand of the user on the handle (8) or the frame.

7. The detection device as claimed in claim 2, wherein said at least one sensor is an inductive sensor and said at least one detection means is a non-magnetic metal target (10) able to move under the action of the hand of the user on the handle (8) or the frame, the target (10) being associated with a coil (L) placed in an oscillating circuit comprising at least one capacitor and having a natural resonant frequency by being connected to an inductive measuring circuit (1) comprising means for oscillating the oscillating circuit at a resonant frequency, means for measuring the resonant frequency and means for comparing between the measured resonant frequency and a predetermined resonant frequency threshold value, in order to detect the user's intention to lock or unlock the opening element through contact of the hand of the user on the handle (8) or the frame, the target (10) being formed by the metallized layer (12), the coil (L) being mounted opposite the metallized layer (12) with respect to the foam block (13), the foam block (13) being able to deform under the action of the hand of the user on the handle (8) or the frame,
further comprising a capacitive sensor and an inductive sensor, the metallized layer (12) simultaneously forming the target (10) of the inductive sensor and the electrode (10) of the capacitive sensor.

8. The detection device as claimed in claim 1, wherein the housing (7a, 7b) is closed and in two parts, with, in the case of a capacitive sensor, a through-recess (17) formed in the housing (7a, 7b) for an electrical connection between the electrode (10) and the capacitive measuring circuit (2) covered by the foam block (13).

9. The detection device as claimed in claim 8, wherein a polyurethane foam is inserted into the housing (7a, 7b) in order to protect and keep the rest of the device housed inside the housing (7a, 7b).

10. A handle (8) or frame of a motor vehicle opening element having an internal cavity, wherein the handle (8) or the frame houses a detection device as claimed in claim 1, the metallized layer (12) being in contact with a portion of an internal wall of the handle (8) or of the frame that delimits the internal cavity, the portion of the outer wall of the handle (8) or of the frame facing the portion of the internal wall forming a detection zone (8a) for detecting an approach and/or contact of a hand of the user on the handle (8) or the frame.

11. The handle (8) or frame as claimed in claim 10, wherein the foam block (13) and the metallized layer (12) are configured so as to locally match the contour of the portion of the internal wall of the handle (8) or of the frame, the foam block (13) wedging the detection device in the internal cavity and protecting against water infiltrating into the detection zone (8a).

12. The detection device as claimed in claim 4, wherein the electrode (10) is divided into two parts, with a first part (l0a) of the electrode forming an extension of the electrode that is electrically connected to the capacitive measuring circuit (2), and a second part formed by the portion of the metallized layer (12) with, in the case of a tab (15), the first longitudinal end of the tab (15) being connected to the first part (l0a) of the electrode or, in the case of a pad (16), the pad (16) being secured on one side to the first part (l0a) of the electrode and secured on another side to the second part of the electrode (10).

13. The detection device as claimed in claim 3, wherein said at least one sensor is an inductive sensor and said at least one detection means is a non-magnetic metal target (10) able to move under the action of the hand of the user on the handle (8) or the frame, the target (10) being associated with a coil (L) placed in an oscillating circuit comprising at least one capacitor and having a natural resonant frequency by being connected to an inductive measuring circuit (1) comprising means for oscillating the oscillating circuit at a resonant frequency, means for measuring the resonant frequency and means for comparing between the measured resonant frequency and a predetermined resonant frequency threshold value, in order to detect the user's intention to lock or unlock the opening element through contact of the hand of the user on the handle (8) or the frame, the target (10) being formed by the metallized layer (12), the coil (L) being mounted opposite the metallized layer (12) with respect to the foam block (13), the foam block (13) being able to deform under the action of the hand of the user on the handle (8) or the frame,
further comprising a capacitive sensor and an inductive sensor, the metallized layer (12) simultaneously forming the target (10) of the inductive sensor and the electrode (10) of the capacitive sensor.

14. The detection device as claimed in claim 4, wherein said at least one sensor is an inductive sensor and said at least one detection means is a non-magnetic metal target (10) able to move under the action of the hand of the user on the handle (8) or the frame, the target (10) being associated with a coil (L) placed in an oscillating circuit comprising at least one capacitor and having a natural resonant frequency by being connected to an inductive measuring circuit (1) comprising means for oscillating the oscillating circuit at a resonant frequency, means for measuring the resonant frequency and means for comparing between the measured resonant frequency and a predetermined resonant frequency threshold value, in order to detect the user's intention to lock or unlock the opening element through contact of the hand of the user on the handle (8) or the frame, the target (10) being formed by the metallized layer (12), the coil (L) being mounted opposite the metallized layer (12) with respect to the foam block (13), the foam block (13) being able to deform under the action of the hand of the user on the handle (8) or the frame,
further comprising a capacitive sensor and an inductive sensor, the metallized layer (12) simultaneously forming the target (10) of the inductive sensor and the electrode (10) of the capacitive sensor.

15. The detection device as claimed in claim 5, wherein said at least one sensor is an inductive sensor and said at least one detection means is a non-magnetic metal target (10) able to move under the action of the hand of the user on the handle (8) or the frame, the target (10) being associated with a coil (L) placed in an oscillating circuit comprising at least one capacitor and having a natural resonant frequency by being connected to an inductive measuring circuit (1) comprising means for oscillating the oscillating circuit at a resonant frequency, means for measuring the resonant frequency and means for comparing between the measured resonant frequency and a predetermined resonant frequency threshold value, in order to detect the user's intention to lock or unlock the opening element through contact of the hand of the user on the handle (8) or the frame, the target (10) being formed by the metallized layer (12), the coil (L) being mounted opposite the metallized layer (12) with respect to the foam block (13), the foam block (13) being able to deform under the action of the hand of the user on the handle (8) or the frame, further comprising a capacitive sensor and an inductive sensor, the metallized layer (12) simultaneously forming the target (10) of the inductive sensor and the electrode (10) of the capacitive sensor.

16. The detection device as claimed in claim 2, wherein the housing (7a, 7b) is closed and in two parts, with, in the case of a capacitive sensor, a through-recess (17) formed in the housing (7a, 7b) for an electrical connection between the electrode (10) and the capacitive measuring circuit (2) covered by the foam block (13).

17. The detection device as claimed in claim 3, wherein the housing (7a, 7b) is closed and in two parts, with, in the case of a capacitive sensor, a through-recess (17) formed in the housing (7a, 7b) for an electrical connection between the electrode (10) and the capacitive measuring circuit (2) covered by the foam block (13).

18. The detection device as claimed in claim 4, wherein the housing (7a, 7b) is closed and in two parts, with, in the case of a capacitive sensor, a through-recess (17) formed in the housing (7a, 7b) for an electrical connection between the electrode (10) and the capacitive measuring circuit (2) covered by the foam block (13).

19. The detection device as claimed in claim 5, wherein the housing (7a, 7b) is closed and in two parts, with, in the case of a capacitive sensor, a through-recess (17) formed in the housing (7a, 7b) for an electrical connection between the electrode (10) and the capacitive measuring circuit (2) covered by the foam block (13).

20. The detection device as claimed in claim 6, wherein the housing (7a, 7b) is closed and in two parts, with, in the case of a capacitive sensor, a through-recess (17) formed in the housing (7a, 7b) for an electrical connection between the electrode (10) and the capacitive measuring circuit (2) covered by the foam block (13).

* * * * *